June 23, 1931.    W. J. BAUROTH    1,811,294
ELECTRIC SWITCH
Filed April 30, 1926    2 Sheets-Sheet 1

Inventor
Walter J. Bauroth

June 23, 1931.  W. J. BAUROTH  1,811,294
ELECTRIC SWITCH
Filed April 30, 1926  2 Sheets-Sheet 2

Patented June 23, 1931

1,811,294

UNITED STATES PATENT OFFICE

WALTER J. BAUROTH, OF COLUMBUS, OHIO, ASSIGNOR TO THE JEFFREY MANUFACTURING COMPANY, OF COLUMBUS, OHIO, A CORPORATION OF OHIO

ELECTRIC SWITCH

Application filed April 30, 1926. Serial No. 105,873.

The present invention relates to certain new and useful improvements in electric switches, of the type adapted to be used in the explosive gas charged atmosphere of a coal mine.

With the adaptation of electric motors to the power requirements of coal, or other mines, it frequently becomes desirable to install electric switches at points subject to the accumulation of explosive gases. Numerous devices have been proposed whereby those parts of the apparatus subject to the formation of electric arcs may be protected from contact with the surrounding gas charged atmosphere, thereby insuring against its accidental ignition.

It is the especial object of this invention to provide and improve mechanism of the class described, which shall be reliable and efficient in service, economical to manufacture, convenient for inspection and repairs, and wherein the electric circuit can be closed only after the protective devices have been placed in protecting position, and the protective devices can be opened for inspection or repair only after the circuit has been broken.

The means whereby I attain this object are fully set forth in the following specification and illustrated in the accompanying drawings of which Fig. 1 is a plan view of the preferred embodiment of my invention showing the protective casing closed.

Like numerals refer to similar parts in the several figures.

Figure 1:
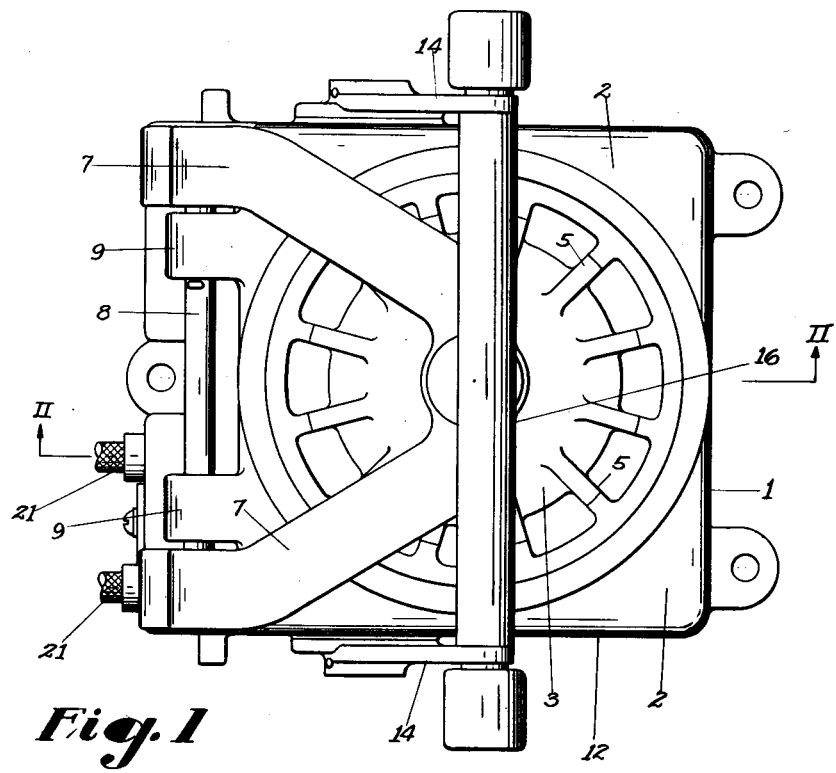
Figure 2:
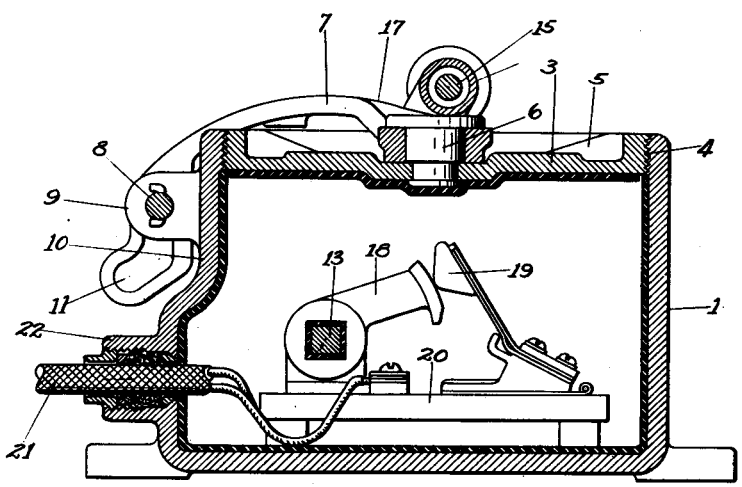
Fig. 2 is a sectional view taken along the line II—II, of Fig. 1.
Figure 3:
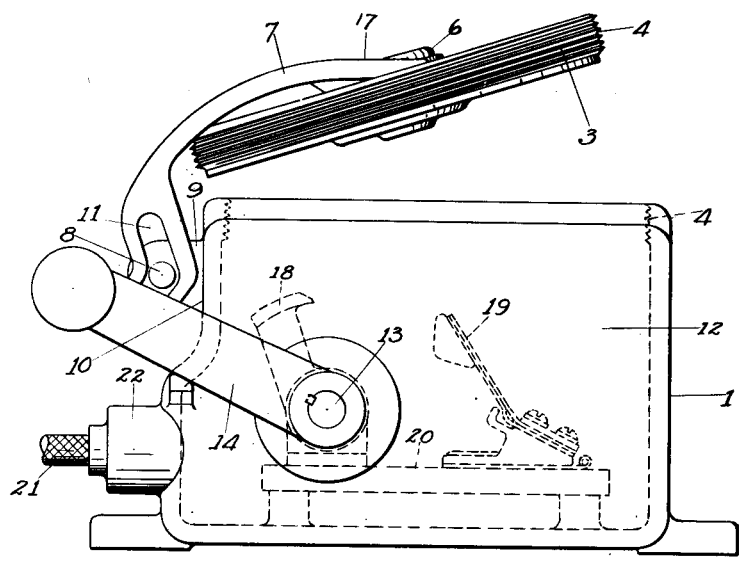
Fig. 3 is an end elevation of the device shown in Figs. 1 and 2, with the protective casing open.

In Figs. 1, 2 and 3 of the drawings I have shown the preferred embodiment of my invention. In these figures the numeral 1 refers to a box or casing which is adapted to enclose the devices which are to be protected. In the upper wall 2 of the casing is formed an opening through which access may be had to the apparatus within the casing. This opening is preferably, though not necessarily, circular in form, and is adapted to receive a cover plate 3 the edges of which are shaped to contact with the edges of the upper wall 2 to form a gas tight joint. In the embodiment here shown the opening in the wall 2, and the cover plate are of circular form and upon their edges are formed cooperating screw threads 4 adapted by their engagement to hold the cover plate securely in place. Radially extending ribs 5 formed on the outer surface of the plate 3 afford convenient means for the rotation of said plate to screw it into or out of closed position. Attached to the cover plate 3 at its center, is a pivot stud 6 which is journaled in a suitable aperture of the hinge arm 7. The hinge arm 7 is rotatable about a hinge pin 8 attached to suitable lugs 9 formed on the side wall 10 of the casing. Provision is made by a slot 11 extending longitudinally of the hinge arm 7 for limited movement of said arm transversely of the hinge pin 8. By this arrangement of parts the cover plate 3 may be moved, in parallelism, outwardly of the casing to clear the upper surface of the top wall 2, after which the hinge arm 7, together with the cover plate 3 may be swung about the hinge pin 8 to remove the cover plate and permit inspection or repair of the devices within the casing. Movement of the cover plate in parallelism, either inwardly or outwardly of the casing, is effected by the action of the screw threads 4 due to the rotary movement of the cover plate.

It will be noted that the extremity of arm 7 extends for a distance parallel to the casing axis, but is terminally divergent therefrom and that angular slot 11 substantially follows the outlines of this extremity. When the cover is in closed position, hinge pin 8 is in the end of slot 11 remote from the extremity of arm 7. During the first outward rectilinear movement of the cover, the extension will move upwardly relative to the pin until the position shown in Fig. 3 is reached, wherein the pin lies at the angle of the slot. If the closure is rotated to the left, retaining pin 8 in the angle of the slot, eventually, and after the cover plate has passed beyond the vertical, extreme end of the extension will abut the casing to retain the cover in its upwardly extending position. This is a particularly useful disposition of parts when the switch is merely to be inspected. If repairs are to be made, the cover may be moved to bring the lower extremity of the slot into engagement with the pin whereupon the cover may be swung over completely to the left to be entirely out of the way.

Projecting through the end wall 2 of the casing and journaled in apertures therein, is a shaft 13 by the rotation of which the switch devices within the casing may be actuated. The bearings for the shaft 13 in the wall of the casing are arranged for gas tight joints, but as such devices are well understood in the art their illustration and description is not thought to be required at this time. To the projecting ends of the shaft 13 are fixed the operating levers 14, and the outer ends of these levers are joined by a rod 15 to form the operating handle by which the shaft 13 may be rotated. Rotatable upon the rod 15 is a roller 16 adapted to engage the curved upper surface 17 of the hinge arm 7 when the handle is moved about the axis of said shaft. The proportions of these parts are such that the handle 16 can not be rotated from its open circuit position to its closed circuit position until the cover plate has been moved into protective position within the opening of the top wall 2 of the casing. It will be noted that the curved upper surface 17 of hinge arm 7 is substantially in the shape of an arc having the axis of shaft 13 as a center when the cover is closed. When the handle is moved to open the switch, roller 16 will thus have prolonged contact with surface 17 so that the cover will by no possibility be released from fully closed position before switch members 18 and 19 have fully separated.

Attached to the shaft 13 and rotatable therewith, but electrically insulated therefrom is a switch blade 18 adapted, when the operating handle is in its forward, or closed circuit position, to engage the contact brush 19 to form an electric connection therewith. The switch blade 18 and contact brush 19 are suitably supported upon an insulating base 20 and may be connected with any preferred electric circuit through the conductors 21 which enter the casing through apertures suitably sealed by gas tight packing glands 22 in the manner which is well understood in the art.

When the cover plate 3 is in place in the opening of the top wall 2, and the switch handle 14 is in forward, or closed circuit position, the electric circuit with which the conductors 21 are connected, is closed by the contact of the blade 18 with the brush 19, and the casing is at the same time securely closed to prevent communication between the atmosphere within and that surrounding the casing. When the handle 14 is moved rearwardly, towards its open circuit position, the cover plate 3 is not released for movement outwardly of the casing until after the movement of the blade 18 away from the brush 19 has interrupted the circuit, thus preventing the possibility of the formation of electric arcs between said blade and said brush.

Figure 4:
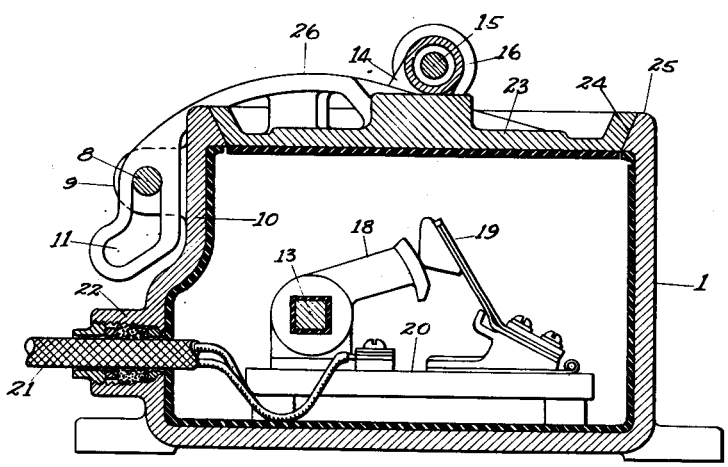
Fig. 4 is a cross sectional view, similar to Fig. 2, showing a modified form of the invention.

While threaded engagement of the cover plate 3 with the top wall 2 of the casing, such as illustrated in Figs. 2 and 3, of the drawings, is generally desirable, it is not essential, and in Fig. 4, I have shown such a casing wherein the cover plate 23 is formed with a straight tapering edge adapted to fit a tapering seat 24 in the top wall 25. In such a construction pivoting of the cover plate upon the hinge arm 26 is unnecessary, and after the switch handle 16 has been moved to its open circuit position the cover plate may be lifted, in parallelism, out of the seat 24 and swung back as above described. In such a construction exclusive dependence is had upon the switch handle 16 to hold the cover plate 23 in its place while the electric circuit is closed.

It is to be understood that the device herein described may be subjected to very considerable modification without departure from the spirit of my invention.

What I claim is:—

1. In a device of the class described, a casing element having a circular collared aperture provided with peripheral threads, a circular peripherally threaded cover element for said aperture, said cover element being removable from said aperture on its axial line upon its rotation relative to the casing in the unscrewing direction, and subsequently in a swinging movement in a plane of its axial line, a hinge pin mounted on the outside of the casing and extending transversely of the plane of swing of the cover element, and a hinge arm pivoted to the central portion of the cover element to permit rotation of the latter about its central axis relative to the arm, said arm having an elongated slot in which said pin engages, whereby the described removal movements are permitted.

2. In a device of the class described, a casing having an aperture, a closure element for said aperture initially removable from the latter in a constrained rectilinear movement directly away from said casing, a lever pivoted to said casing, a handle on the free end of said lever adapted to swing over the closure element, and a hinge arm connecting said casing and closure element and extending over a portion of the outer face of the latter, said arm having a portion uniformly engaged by said handle throughout a substantial angle of movement of said lever to secure the closure element in closed position.

3. In a device of the class described, a casing having an aperture, a closure element for said aperture, a lever pivoted to said casing, a handle on the free end of said lever adapted to swing over the closure element, and a hinge arm connecting said casing and closure element and extending over a portion of the outer face of the latter, said arm having a portion engageable by said handle to secure the closure element in closed position.

4. In a device of the class described, a casing having an aperture therein, a closure element for said aperture removable therefrom in an initially substantially rectilinear movement directly away from said casing and in a subsequent swinging movement in the plane of said rectilinear movement, a hinge arm on the closure, said arm having an extremity projecting for a distance along the outside of the casing parallel to the line of initial movement of the casing and terminally divergent from said line, said extremity having an angular slot therein following the described contour thereof, and a hinge pin on the casing extending through said slot transversely of said extremity, the hinge pin being engaged in the end of said slot remote from the end of said extremity when the closure is in closed position.

In testimony whereof I have hereunto set my hand.

WALTER J. BAUROTH.